United States Patent [19]

Kubo

[11] Patent Number: 5,241,676
[45] Date of Patent: Aug. 31, 1993

[54] METHOD FOR CONTROLLING PROCESS PRIORITY IN SEMAPHORE OPERATION

[75] Inventor: Hitoshi Kubo, Tanashi, Japan

[73] Assignee: Kabushiki Kaisha Toshiba, Kawasaki, Japan

[21] Appl. No.: 523,816

[22] Filed: May 15, 1990

[30] Foreign Application Priority Data

May 16, 1989 [JP] Japan .................. 1-122314

[51] Int. Cl.⁵ .............................................. G06F 9/46
[52] U.S. Cl. ..................... 395/650; 395/725; 364/DIG. 1; 364/242.8; 364/281.6; 364/281.7; 364/281.8
[58] Field of Search ............... 395/650, 725; 364/DIG. 1, DIG. 2

[56] References Cited

U.S. PATENT DOCUMENTS

| | | | |
|---|---|---|---|
| 4,084,224 | 4/1978 | Appell et al. | 395/700 |
| 4,316,245 | 2/1982 | Luu et al. | 395/650 |
| 4,320,451 | 3/1982 | Bachman et al. | 395/650 |
| 4,374,409 | 2/1983 | Bienvenu et al. | 395/650 |
| 4,395,757 | 7/1983 | Bienvenu et al. | 395/650 |
| 4,590,555 | 5/1986 | Bourrez | 395/650 |
| 4,725,946 | 2/1988 | Prange et al. | 395/775 |
| 4,908,750 | 3/1990 | Jablow | 395/650 |
| 4,964,040 | 10/1990 | Wilcox | 395/425 |

OTHER PUBLICATIONS

Kyoritsu Sogo Computer Dictionary, pp. 316–317, 1.2.2.1 Sync. Control and Exclusive Control, (1976).

*Primary Examiner*—Paul V. Kulik
*Assistant Examiner*—Matthew C. Fagan
*Attorney, Agent, or Firm*—Finnegan, Henderson, Farabow, Garrett & Dunner

[57] ABSTRACT

In the P operation of a semaphore operation, the semaphore priority set in the semaphore is compared with the process priority of an execution process. When the semaphore priority is higher than the process priority of the execution process, the process priority is changed to the semaphore priority and the process is executed in accordance with the changed process priority. In the V operation, on the other hand, the semaphore priority is compared with the process priority of the first process which is placed in the wait state. When the semaphore priority is higher than the process priority of the first process in the wait state, the process priority is changed to the semaphore priority and the process is placed in the ready state. Furthermore, the process priority of the process in the ready state is compared with the process priority of an execution process. When the process priority of the process in the ready state is higher than the process priority of the execution process, the execution process is placed in the ready state.

4 Claims, 4 Drawing Sheets

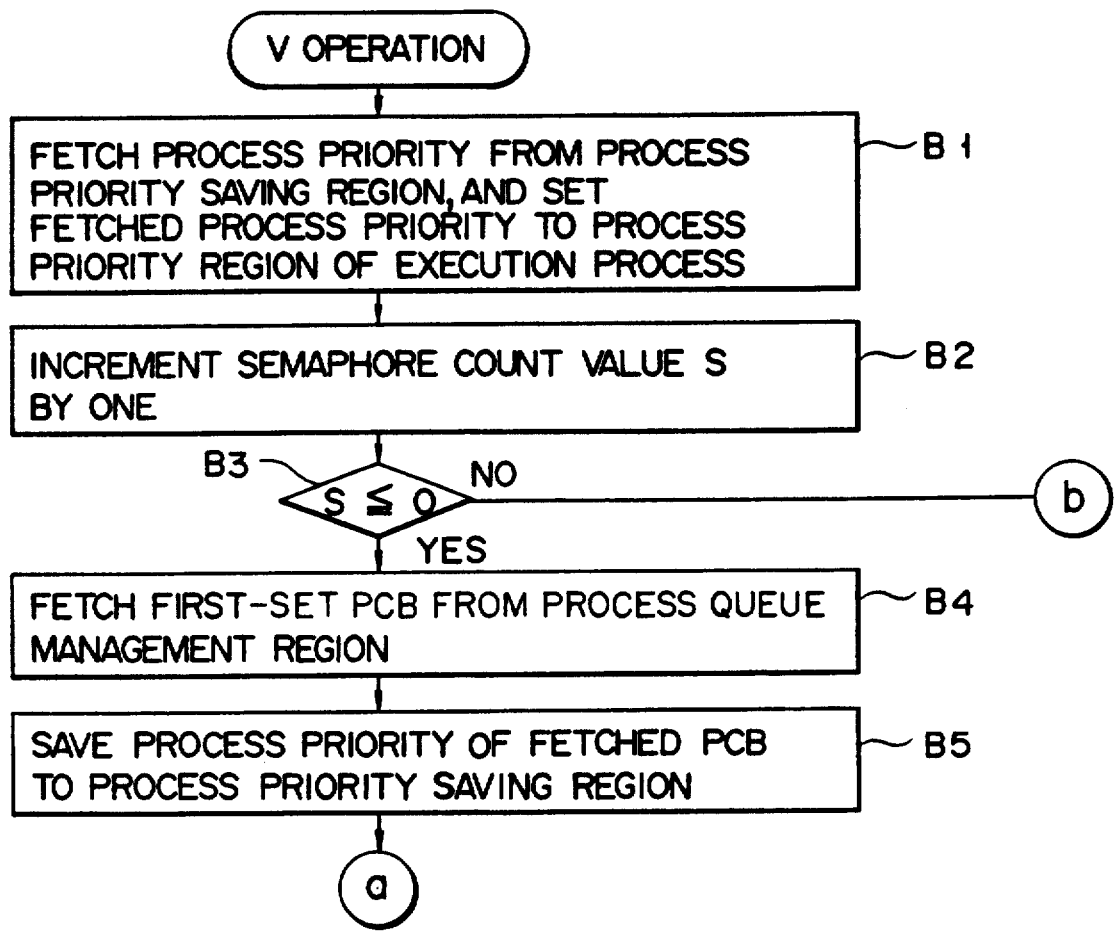
F I G. 4A

METHOD FOR CONTROLLING PROCESS PRIORITY IN SEMAPHORE OPERATION

BACKGROUND OF THE INVENTION

1. Field of the Invention

The present invention relates to a method for controlling the process priority in a semaphore operation.

2. Description of the Related Art

In a data processing system capable of executing a multitask process, the exclusive control of resources is performed by the use of semaphore. The semaphore has no concept of the priority. Thus, the priorities of processes are not changed in semaphore operations such as a P operation (an occupying operation) and a V operation (a release operation). Hence, during a period a predetermined process uses a resource by securing the resource by the P operation, if another process having a higher priority is linked to a CPU (central processing unit) loop, all the processes requesting the use of the resource will be placed in the wait state until the resource becomes available.

To avoid such a wait state, the setting of a program has been performed in such a way as to increase the priority of a process before execution of the P operation and decrease it after the execution of the V operation (restore it to the original priority). With this approach, however, there is a need for executing a priority controlling process before and after the execution of the semaphore operation, thus increasing a CPU running (operation) time and degrading the system's performance.

Therefore, to improve the system's performance, a method for controlling the priority of process in the semaphore operation has been desired.

SUMMARY OF THE INVENTION

It is an object of the present invention to provide a method for controlling a process priority in a semaphore operation.

According to the present invention, there is provided a method for controlling a process priority in a plurality of processes by a semaphore having a semaphore priority in a semaphore operation including a first operation and second operation, process priorities being assigned to the processes, the method comprising the steps of:

comparing the semaphore priority with the process priority of a first process in a run state in the first operation;

changing the first process priority into the semaphore priority when the semaphore priority is higher than the first process priority;

returning the changed first process priority to the first process priority in the second operation;

comparing the semaphore priority with a second process priority of a second process in a wait state;

changing the second process priority into the semaphore priority when the semaphore priority is higher than the second process priority;

readying the second process in the wait state;

comparing the returned first process priority with the changed second process priority;

readying the first process in the run state when the returned second process priority is higher than the changed second process priority; and selecting a process having a highest process priority from a plurality of processes in the ready state to dispatch the selected process.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIGS. 3, 4A and 4B are flowcharts of a process priority controlling process in a semaphore operation according to an embodiment of the present invention.

DETAILED DESCRIPTION OF THE PREFERRED EMBODIMENT

Figure 1:
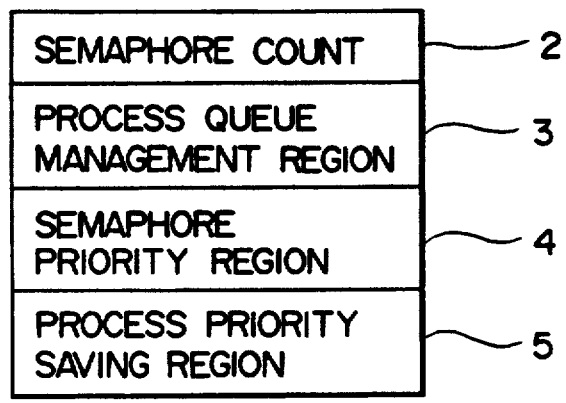
FIG. 1 illustrates a configuration of a semaphore.

Referring now to FIG. 1, a semaphore 1 comprises a semaphore count 2, a process queue management region 3, a semaphore priority region 4 and a process priority saving region 5. The priority specific to the semaphore itself is set in semaphore priority region 4.

Figure 2:
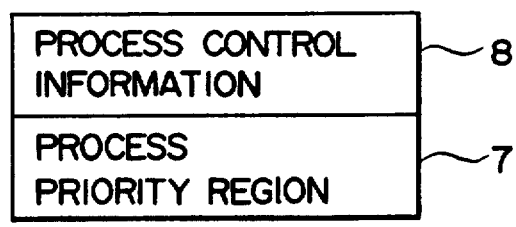
FIG. 2 illustrates a configuration of a process control block.

As shown in FIG. 2, process control block (hereinafter abbreviated to PCB) 6 comprises a process control information 8 and a process priority region 7. The process priority is set in process priority region 7.

Next, the process priority controlling process in the semaphore operation (P operation and V operation) by a single processor, such as a CPU (central processing unit), for executing multitask processing will be described with reference to flowcharts shown in FIGS. 3, 4A and 4B.

Figure 3:
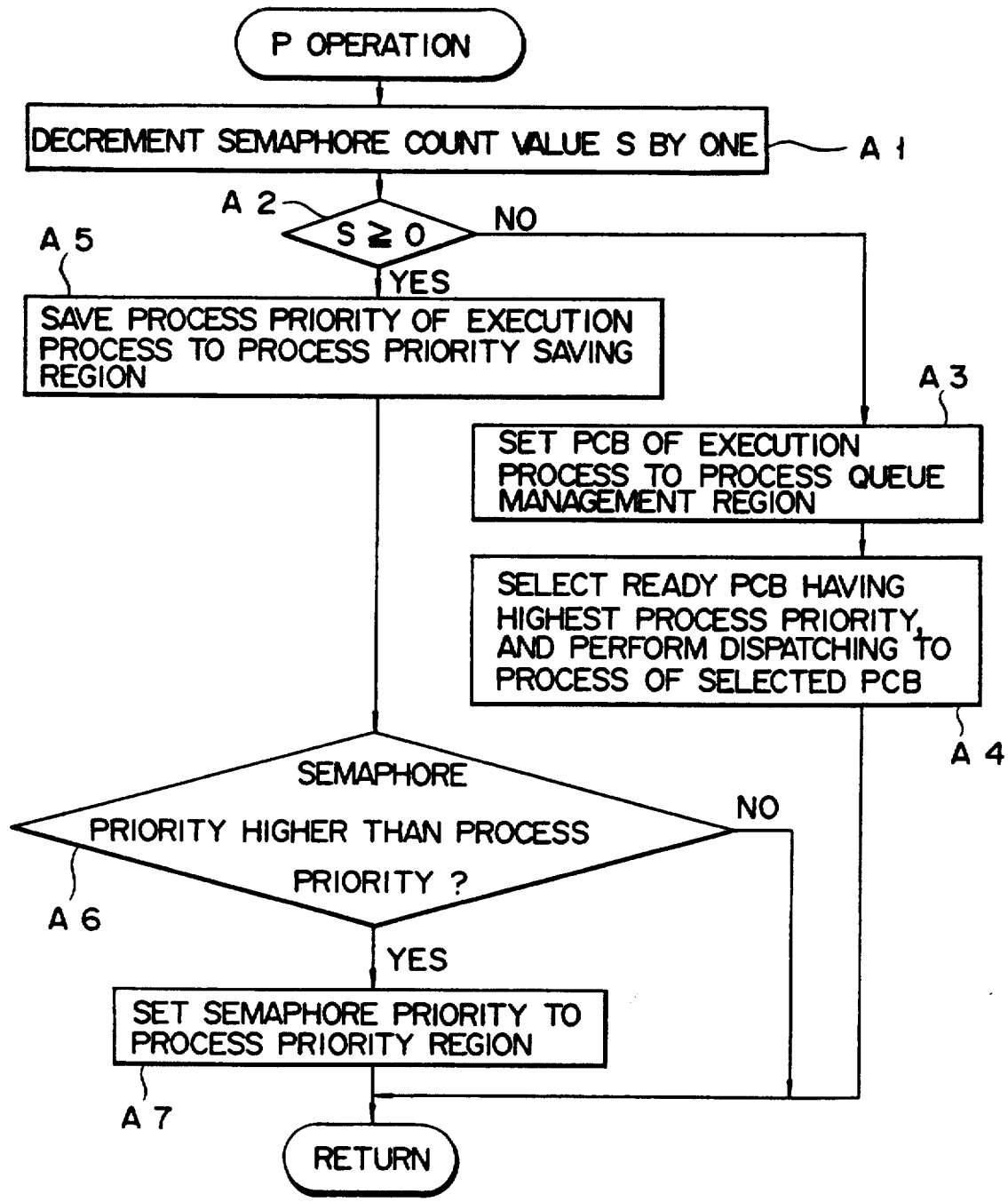

In the P operation shown in FIG. 3, a semaphore count value S of semaphore count 2 in semaphore 1 is decremented by one in step A1. In step A2, it is determined whether or not the semaphore count value S is equal to or larger than 0.

When S<0 in step A2, it is determined that semaphore 1 has been locked by another process. Thus, PCB 6 corresponding to an execution process is set as a process queue in process queue management region 3 of semaphore 1 in step A3. That is, the execution process is placed in the wait state.

In step A4, the PCB having the highest process priority in the PCB in the ready state is selected and dispatching is performed to the process of the selected PCB. Accordingly, the process of the selected PCB is being executed by the single processor (or is in the running state).

When S≥0 in step A2, it is determined that the P operation has been performed. Thus, the process priority of the execution process, i.e., the process priority set in process priority region 7 of PCB 6 is saved in process priority saving region 5 of semaphore 1 in step A5.

In step A6, the semaphore priority set in semaphore priority region 4 of semaphore 1 is compared with the process priority saved in process priority saving region 5.

If the semaphore priority is higher than the process priority in step A6, then the process priority is changed to the semaphore priority. That is, the semaphore priority set in semaphore priority region 4 is set in process priority region 7 of PCB 6 in step A7. Thus, the execution process can be performed in accordance with the changed process priority.

If the semaphore priority is lower than the process priority in step A6, no change is performed to the process priority.

As described above, in the process priority controlling process for an execution process in the P operation, for example, a user-level process having a relatively low priority has its process priority changed to the semaphore priority set in semaphore 1 and then performed in accordance with the changed process priority. With a process having a high process priority for an operating system, on the other hand, it is performed in accordance with its high process priority.

Figure 4B:
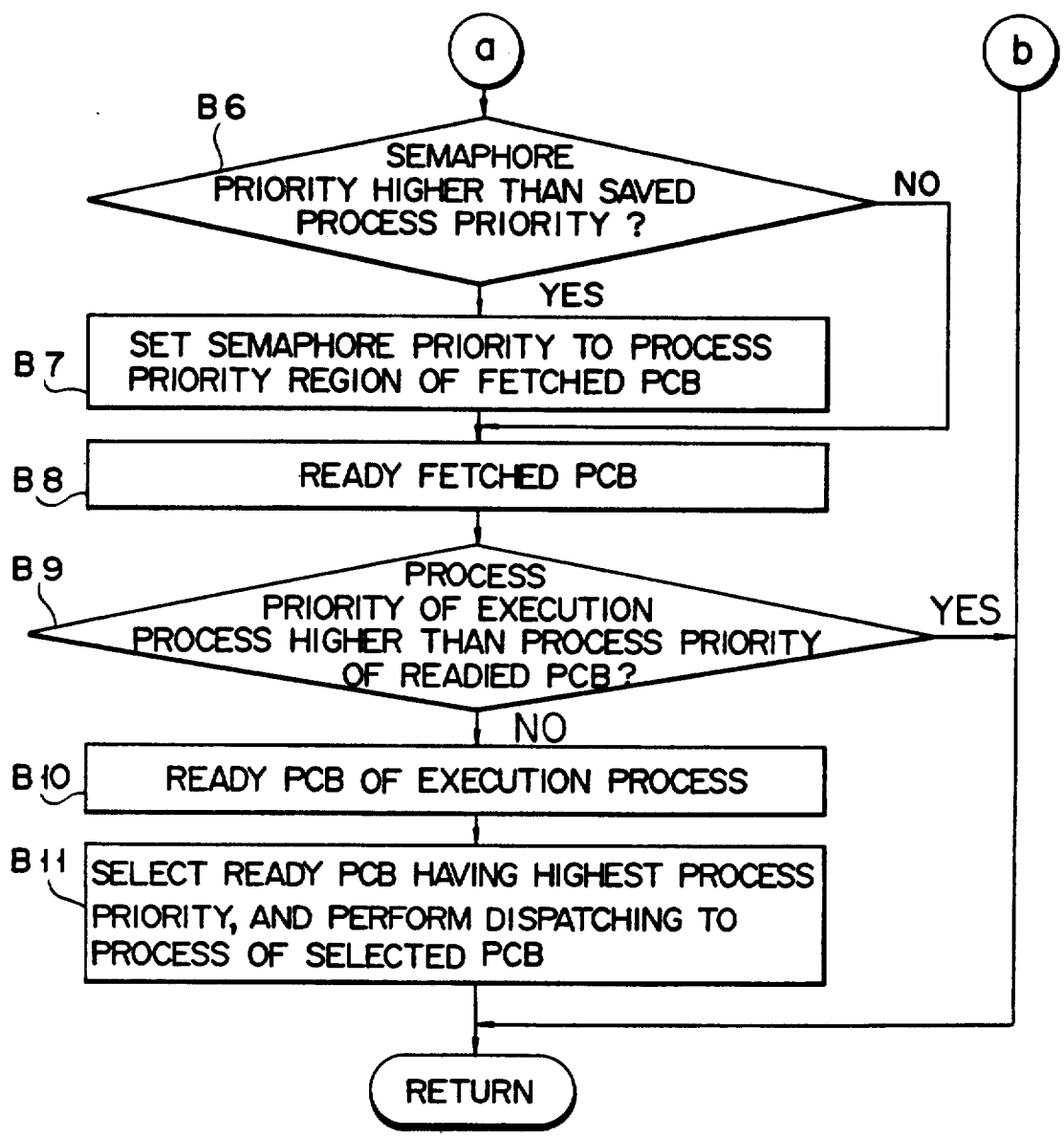

In the V operation shown in FIGS. 4A and 4B, a process priority is fetched from process priority saving region 5 of semaphore 1 and the fetched process priority is set in the process priority region 7 of PCB 6 of the execution process in step B1. That is, the process priority of the execution process is changed to the process priority saved in process priority saving region 5. This means that the process priority of the execution process set to a higher one in the P operation is returned to the process priority set in advance.

In step B2, the semaphore count value S of semaphore count 2 is incremented by one. In step B3, it is determined whether or not the semaphore count value S is less than or equal to 0.

When S>0 in step B3, no other process is in the wait state and thus the process continues to be executed.

When S≦0 in step B3, the PCB is set in process queue management region 4 of semaphore 1. Thus, the first-set PCB is fetched from process queue management region 4 in step B4. The process priority of the fetched PCB is saved in process priority saving region 5 of semaphore 1 in step B5.

In step B6, the semaphore priority set in semaphore priority region 4 of semaphore 1 is compared with the process priority saved in process priority saving region 5.

When the semaphore priority is higher than the saved process priority in step B6, the semaphore priority is set in process priority region 7 of the fetched PCB in step B7. That is, the process priority of the fetched PCB is changed to the semaphore priority. Thus, the process is operated in accordance with the semaphore priority set in process priority region 7 of the fetched PCB.

When the semaphore priority is lower than the saved process priority in step B6, on the other hand, the process priority of the fetched PCB is not changed.

In step B8, the state of the fetched PCB is changed from the wait state to the ready state. Thus, the process of the fetched PCB is dispatched.

In step B9, the process priority of an execution process is compared with the process priority of the PCB in the ready state.

When the process priority of the PCB in the ready state is higher than the process priority of the execution process in step B9, the PCB of the execution process is placed in the ready state in step B10.

In step B11, the PCB having the highest process priority is selected from the PCB placed in the ready state and the dispatching is performed to the process of the selected PCB.

When the process priority of the PCB placed in the ready state is lower than the process priority of the execution process in step B9, on the other hand, the process continues to be executed.

As described above, by setting process priority in the semaphore, the process priority can be controlled easily in the exclusive control of resources. In addition, by controlling the process priority for resource exclusive control, the system's performance can be improved.

Although the resource exclusive control using the semaphore has been described in the above embodiment, the process priority controlling process of the present embodiment may also be applied to resource exclusive control without using a semaphore.

Additional advantages and modifications will readily occur to those skilled in the art. Therefore, the invention in its broader aspects is not limited to the specific details, representative devices, and illustrated examples shown and described. Accordingly, various modifications may be made without departing from the spirit or scope of the general inventive concept as defined by the appended claims and their equivalents.

What is claimed is:

1. A multitask processing method for executing any one of a plurality of processes each having a different process priority by using a semaphore having a semaphore priority in a semaphore operation including a first operation and second operation, each process being in a running state, wait state or ready state, the method, performed in a single processor, comprising the steps of:
   comparing, in the first operation, the semaphore priority with a first process priority of a first one of the processes which is in the running state;
   changing the first process priority into a first changed priority corresponding to the semaphore priority when the semaphore priority is higher than the first process priority, to execute the first process;
   returning, in the second operation, the first changed priority to the first process priority;
   comparing the semaphore priority with a second process priority of a second one of the plurality of processes which is in the wait state;
   changing the second process priority into a second changed priority corresponding to the semaphore priority when the semaphore priority is higher than the second process priority;
   setting the second process having the second changed priority in the ready state;
   comparing the returning first process priority with the second changed priority;
   setting the first process in the ready state when the second changed priority is higher than the returned first process priority; and
   selecting a process having a highest process priority from among the process priorities of the processes which are in the ready state to execute the selected process.

2. The method according to claim 1, wherein the first operation includes a P operation for occupying a resource during execution of the first process and the second operation includes a V operation for releasing the occupied resource during execution of the first process.

3. A multitask processing method for executing any one of a plurality of processes each having a different process priority by using a semaphore in a semaphore operation having a first operation and second operation, the semaphore including a first region for storing a semaphore priority and a second region for storing the process priority of one of the processes, each of a plurality of process control blocks corresponding to the processes for storing the different process priority, each process being in a running state, wait state or ready state, the method, performed in a single processor, comprising the steps of:

saving, in the first operation, a first process priority stored in a first process control block corresponding to a first one of the processes which is in the running state to the second region of the semaphore;

comparing the semaphore priority with the saved process priority;

storing a first changed priority corresponding to the semaphore priority into the first process control block when the semaphore priority is higher than the saved process priority;

returning, in the second operation, the saved process priority to the first process control block;

comparing the semaphore priority stored in the first region of the semaphore with a second process priority stored in a second process control block corresponding to a second one of the processes which is in the wait state;

storing a second changed priority corresponding to the semaphore priority in the second process control block when the semaphore priority is higher than the second process priority stored in the second process control block;

setting the second process in the ready state;

comparing the returned process priority with the second changed priority;

setting the first process in the ready state when the second changed priority is higher than the returned process priority; and selecting a process having a highest process priority from among the process priorities of the processes which are in the ready state to execute the selected process.

4. The method according to claim 3, wherein the first operation includes a P operation for occupying a resource during execution of the first process and the second operation includes a V operation for releasing the occupied resource during execution of the first process.

* * * * *

UNITED STATES PATENT AND TRADEMARK OFFICE
CERTIFICATE OF CORRECTION

PATENT NO. : 5,241,676
DATED : August 31, 1993
INVENTOR(S) : Hitoshi KUBO

It is certified that error appears in the above-indentified patent and that said Letters Patent is hereby corrected as shown below:

Claim 3, column 5, line 10, change "priority"
to --priorities,--.

Signed and Sealed this

Twenty-fifth Day of October, 1994

Attest:

BRUCE LEHMAN

*Attesting Officer*    Commissioner of Patents and Trademarks